(12) United States Patent
Nibe

(10) Patent No.: US 8,595,580 B2
(45) Date of Patent: Nov. 26, 2013

(54) RADIO DEVICE AND RADIO COMMUNICATION CONTROL METHOD

(75) Inventor: Keiji Nibe, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/479,161

(22) Filed: May 23, 2012

(65) Prior Publication Data

US 2012/0331365 A1    Dec. 27, 2012

(30) Foreign Application Priority Data

Jun. 23, 2011  (JP) .................................. 2011-139862

(51) Int. Cl.
*H04L 1/18*  (2006.01)
*G08C 25/02*  (2006.01)

(52) U.S. Cl.
USPC .......................................................... 714/748

(58) Field of Classification Search
USPC .......................................................... 714/748
See application file for complete search history.

(56) References Cited

U.S. PATENT DOCUMENTS

| | | | |
|---|---|---|---|
| 7,076,718 B2 * | 7/2006 | Miyoshi ........................ | 714/748 |
| 7,155,655 B2 * | 12/2006 | Cheng ........................... | 714/748 |
| 7,165,203 B2 * | 1/2007 | Baudry et al. ................. | 714/748 |
| 7,765,451 B2 * | 7/2010 | Yomo et al. .................... | 714/749 |
| 8,195,999 B2 * | 6/2012 | Choi et al. ..................... | 714/748 |
| 8,291,275 B2 * | 10/2012 | Miyoshi et al. ............... | 714/748 |
| 8,332,704 B2 * | 12/2012 | Chang et al. .................. | 714/748 |
| 8,341,483 B2 * | 12/2012 | Yokoyama ..................... | 714/749 |
| 8,397,119 B2 * | 3/2013 | Chang et al. .................. | 714/749 |
| 8,402,336 B2 * | 3/2013 | McBeath et al. .............. | 714/749 |
| 8,443,247 B2 * | 5/2013 | Duan et al. .................... | 714/748 |
| 8,473,803 B2 * | 6/2013 | Jung et al. ..................... | 714/749 |
| 2010/0290566 A1 | 11/2010 | Nibe | |

FOREIGN PATENT DOCUMENTS

JP    2010-268395 A    11/2010

* cited by examiner

*Primary Examiner* — James C Kerveros

(74) *Attorney, Agent, or Firm* — Maschoff Brennan

(57) ABSTRACT

A radio device includes a radio section which transmits a digital signal through a digital communication path, and a baseband processing section which performs a baseband processing on the digital signal received from the radio section, wherein the baseband processing section performs error detection of the digital signal before performing the baseband processing, and wherein, when an error is detected in the digital signal, the baseband processing section performs the baseband processing without waiting for reception of a retransmitted signal from the radio section.

19 Claims, 9 Drawing Sheets

RADIO DEVICE AND RADIO COMMUNICATION CONTROL METHOD

CROSS-REFERENCE TO RELATED APPLICATIONS

This application is based upon and claims the benefit of priority from the prior Japanese Patent Application No. 2011-139862 filed on Jun. 23, 2011, the entire contents of which are incorporated herein by reference.

FIELD

Embodiments discussed herein are related to a radio device, a radio communication control method, and a storage medium that stores a radio communication control program.

BACKGROUND

A radio device such as a mobile phone includes, for example, a Radio Frequency (RF) section (radio section) and a baseband processing section, and an interface between the RF section and the baseband processing section includes an analog signal line and a digital control line or an analog control line.

In recent years, as an RF-Integrated Circuit (IC) is formed into a Complementary Metal-Oxide Semiconductor) CMOS, an Analog Digital Converter or a Digital Analog Converter may be provided inside the RF-IC. Accordingly, there is a standard called "DigRF" for coupling the RC-IC to a digital IC, which performs baseband processing, by an interface.

As for a version of the DigRF standard, called "DigRFv4," error detection of data communication between the RF section and the baseband processing section is performed. If an error is detected, retransmission control of data is performed. For example, to transmit the data to the baseband processing section from the RF section, the baseband processing section performs error check of the data transmitted from the RF section. If the error is detected, the baseband processing section transmits a retransmission request of the data to the RF section. When receiving the retransmission request of the data, the RF section retransmits the data to the baseband processing section.

SUMMARY

According to an aspect of the invention, a radio device includes a radio section which transmits a digital signal through a digital communication path, and a baseband processing section which performs a baseband processing on the digital signal received from the radio section, wherein the baseband processing section performs error detection of the digital signal before performing the baseband processing, and wherein, when an error is detected in the digital signal, the baseband processing section performs the baseband processing without waiting for reception of a retransmitted signal from the radio section.

Additional objects and advantages of the embodiments will be set forth in part in the description which follows, and in part will be obvious from the description, or may be learned by practice of the embodiments. The object and advantages of the embodiments will be realized and attained by means of the elements and combinations particularly pointed out in the appended claims.

It is to be understood that both the foregoing general description and the following detailed description are exemplary and explanatory and are not restrictive of the embodiments, as claimed.

DESCRIPTION OF EMBODIMENTS

With reference to the diagram, the embodiments of a radio device, a radio communication control method, and computer-readable recording medium having stored therein a program for causing a computer to execute a radio communication control process will be described in detail. The disclosed technique is not limited to the following embodiments.

While inventing the present embodiments, observations were made regarding a related art. Such observations include the following, for example.

In a technique used for a radio device of the related art, it may be possible that suppression of occurrence of processing delay caused by a retransmission control of data is not considered.

For example, according to the technique, it may be possible that transmission power control as specified in the Third Generation Partnership Project (3GPP) is not performed due to the retransmission control of data. That is, according to technical specifications of the 3GPP, the radio device receives a downlink Dedicated Physical Channel (DPCH) and demodulates Up/Down information of the transmission power of a TPC bit included in the DPCH. According to technical specifications of the 3GPP, the transmission power control is performed based on the Up/Down of the transmission power. Here, regarding the downlink DPCH, a delay offset of 296 chips at the highest occurs at the time of Soft Hand Over (SHO). Therefore, considering the maximum delay of the DPCH, the radio device has to perform transmission power control by reflecting the Up/Down information of the TPC bit after receiving the TPC symbol after 216 chips.

On the contrary, to perform the retransmission control of reception data, the radio device demodulates the Up/Down information of the transmission power of the TPC bit after waiting for the retransmission of the DigRF packet, and then performs the processing of the baseband processing section and the like, so that the baseband demodulating processing is delayed. As a result, it may be possible that the Up/Down information of the TPC bit is not reflected after 216 chips after the TPC symbol is received, so that the transmission power processing as specified in 3GPP is not performed.

Figure 1:
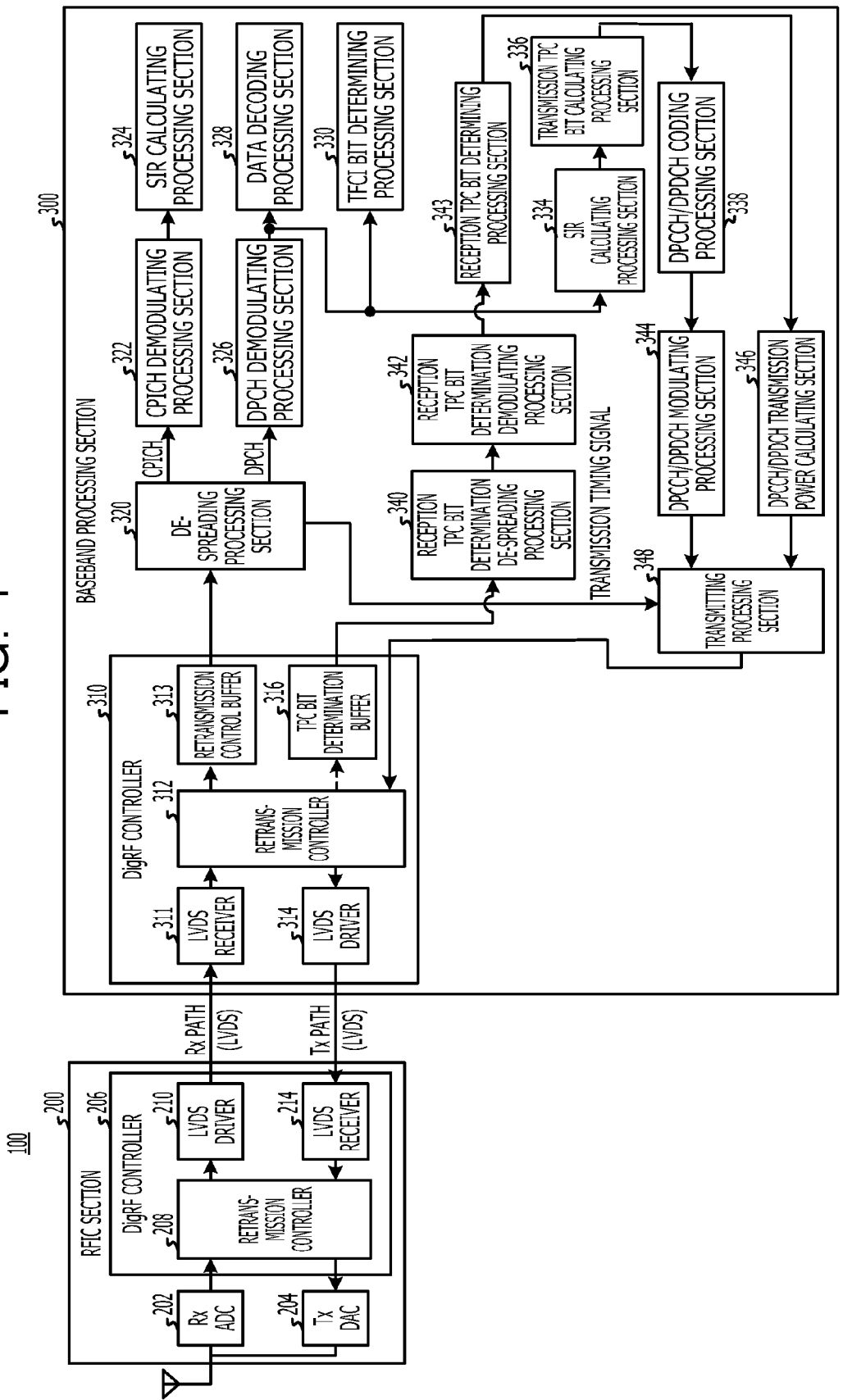
FIG. 1 is a diagram illustrating an entire configuration of a first embodiment of a radio device.

FIG. 1 is a diagram illustrating an entire configuration of a first embodiment of a radio device. As illustrated in FIG. 1, a radio device 100 includes an RFIC section 200 and a baseband processing section 300. The RFIC section 200 transmits and receives a radio signal to and from another radio device through an antenna. The baseband processing section 300 is coupled to the RFIC section 200 through a digital communication path to perform baseband processing on a digital signal received from the RFIC section 200 through the digital communication path.

The RFIC section 200 includes an RxADC 202, a TxDAC 204, and a DigRF controller 206. The DigRF controller 206 includes a retransmission controller 208, a Low Voltage Differential Signaling (LVDS) Driver 210, and an LVDSReceiver 214.

The RxADC 202 receives the radio signal transmitted from an external radio device through the antenna. The TxDAC 204 transmits the radio signal transmitted from the DigRF controller 206 to an external section through the antenna.

The retransmission controller 208 buffers the data received from the RxADC 202 in a memory to be retransmitted and then outputs the received data to the LVDSDriver 210. When receiving a retransmission request from the baseband processing section 300, the retransmission controller 208 outputs the buffered data as retransmission data to the LVDSDriver 210.

The LVDS Driver 210 DigRF-packetizes the received data, performs LVDS drive processing on the DigRF packet, and outputs the DigRF packet to the baseband processing section 300 through an RxPath. The LVDSReceiver 214 receives and outputs the transmission signal or the retransmission request signal output from the baseband processing section 300 to the retransmission controller 208.

On the other hand, the baseband processing section 300 includes a DigRF controller 310, a de-spreading processing section 320, a Common Pilot Channel demodulating processing section 322, and a Signal to Interference Ratio (SIR) calculating processing section 324. The baseband processing section 300 includes a Dedicated Physical Channel demodulating processing section 326, a Data decoding processing section 328, and a Transport Format Combination Indicator bit determining processing section 330. The baseband processing section 300 includes an SIR calculating processing section 334, a transmission TPC bit calculating processing section 336, and a Dedicated Physical Control Channel (DPCCH)/Dedicated Physical Data Channel (DPDCH) coding processing section 338. The baseband processing section 300 includes a reception Transmission Power Control (TPC) bit determination de-spreading processing section 340, a reception TPC bit determination demodulating processing section 342, and a reception TPC bit determining processing section 343. The baseband processing section 300 includes a DPCCH/DPDCH modulating processing section 344, a DPCCH/DPDCH transmission power calculating section 346, and a transmitting processing section 348.

The DigRF controller 310 includes an LVDSReceiver 311, a retransmission controller 312, a retransmission control buffer 313, an LVDSDriver 314, and a TPC bit determination buffer 316.

The LVDSReceiver 311 performs LVDS receiving processing by receiving the DigRF packet output from the LVDSDriver 210. The retransmission controller 312 determines whether a data error occurs to the DigRF packet received by the LVDSReceiver 311. If the data error occurs to the DigRF packet, the retransmission controller 312 performs Nack transmission to the LVDSDriver 314 and stores the DigRF packet in the TPC bit determination buffer 316. On the other hand, if no error occurs, the retransmission controller 312 stores the DigRF packet in the retransmission control buffer 313 and the TPC bit determination buffer 316. Moreover, when the DigRF packet is retransmitted from the DigRF controller 206, the retransmission controller 312 replaces the DigRF packet, to which the error occurred, stored in the retransmission control buffer 313 with the retransmitted DigRF packet and then outputs the retransmitted DigRF packet to the de-spreading processing section 320. The LVDSDriver 314 transmits a Nack signal output from the retransmission controller 312 to the DigRF controller 206 and then performs the retransmission request.

The de-spreading processing section 320 performs the de-spreading of the reception data, divides the reception data into channels (CPICH, DPCH, and the like) and then outputs the reception data to the CPICH demodulating processing section 322 and the DPCH demodulating processing section 326. The CPICH demodulating processing section 322 performs the demodulating processing of the data output from the de-spreading processing section 320. The DPCH demodulating processing section 326 performs the demodulating processing of the data output from the de-spreading processing section 320. The SIR calculating processing section 324 calculates an SIR value from the data output from the CPICH demodulating processing section 322. As with the conventional technique, an SIR calculating method is performed by calculating a ratio of an interference component I to a signal component S of any number of symbols.

The data decoding processing section 328 performs decoding processing of the data output from the DPCH demodulating processing section 326. The TFCI bit determining processing section 330 performs determining processing of the TFCI bit based on the data output from the DPCH demodulating processing section 326.

The SIR calculating processing section 334 calculates the SIR value from a pilot bit of the data output from the DPCH demodulating processing section 326. The transmission TPC bit calculating processing section 336 calculates the transmission TPC bit based on the SIR value output from the SIR calculating processing section 334. The DPCCH/DPDCH coding processing section 338 performs the decoding processing on the TPC bit calculated by the transmission TPC bit calculating processing section 336.

If the error is detected in the RigRF packet by the retransmission controller 312, the radio device 100 according to the present embodiment includes a first processing performing section that waits for reception of a retransmission signal from the RFIC section 200 and then performs the baseband processing based on the received retransmission signal. The first processing performing section is a processing section such as, for example, the de-spreading processing section 320, the CPICH demodulating processing section 322, the DPCH demodulating processing section 326, or the like.

On the other hand, when the TPC bit determination buffer 316 stores the DigRF packet, the reception TPC bit determination de-spreading processing section 340 performs the de-spreading processing on the TPC bit in the DigRF packet. The reception TPC bit determination demodulating processing section 342 performs the demodulating processing of the data that is subjected to the de-spreading by the reception TPC bit determination de-spreading processing section 340 and then outputs the data to the reception TPC bit determining processing section 343. The reception TPC bit determining processing section 343 determines whether the TPC bit of the data output from the reception TPC bit determination demodulating processing section 342 is Up or Down.

The DPCCH/DPDCH modulating processing section 344 performs the modulating processing on the TPC bit that is subjected to the decoding processing by the DPCCH/DPDCH coding processing section 338 and then outputs the TPC bit to the transmitting processing section 348. The DPCCH/DP- DCH transmission power calculating section 346 calculates a transmission power of DPCCH/DPDCH from the Up/Down information of the reception TPC bit determined by the reception TPC bit determining processing section 343 and then outputs the transmission power to the transmitting processing section 348. The transmitting processing section 348 is synchronized with a transmission timing signal output from the de-spreading processing section 320 to perform the transmitting processing that includes power control of DPCCH and DPDCH. The data transmitted from the transmitting processing section 348 is transmitted to the RFIC section 200 through the DigRF controller 310 and is then transmitted to the outside from the RFIC section 200.

The retransmission controller 312 according to the present embodiment determines whether the data error occurs to the received DigRF packet. Even if the data error occurs, the retransmission controller 312 stores the DigRF packet in the TPC bit determination buffer 316. Furthermore, the reception TPC bit determination de-spreading processing section 340 performs the de-spreading processing of the TPC bit of the DigRF packet, which is stored in the TPC bit determination buffer 316, without waiting for the retransmission of the DigRF packet. Moreover, the reception TPC bit determination demodulating processing section 342 performs the demodulating processing of the data that is subjected to the de-spreading by the reception TPC bit determination de-spreading processing section 340. The reception TPC bit determining processing section 343 determines whether the TPC bit of the data output from the reception TPC bit determination demodulating processing section 342 is Up or Down. In this manner, if the error is detected in the DigRF packet by the retransmission controller 312, the radio device 100 includes a second processing performing section that performs the baseband processing based on the DigRF packet in which the error is detected and that does not wait for reception of the retransmission signal from the RFIC section 200. The second processing performing section is, for example, the reception TPC bit determination de-spreading processing section 340, the reception TPC bit determination demodulating processing section 342, the reception TPC bit determining processing section 343, or the like. Therefore, according to the present embodiment, the retransmission of the DigRF packet may suppress delay of the Up/Down determination of the reception TPC bit.

Figure 2:
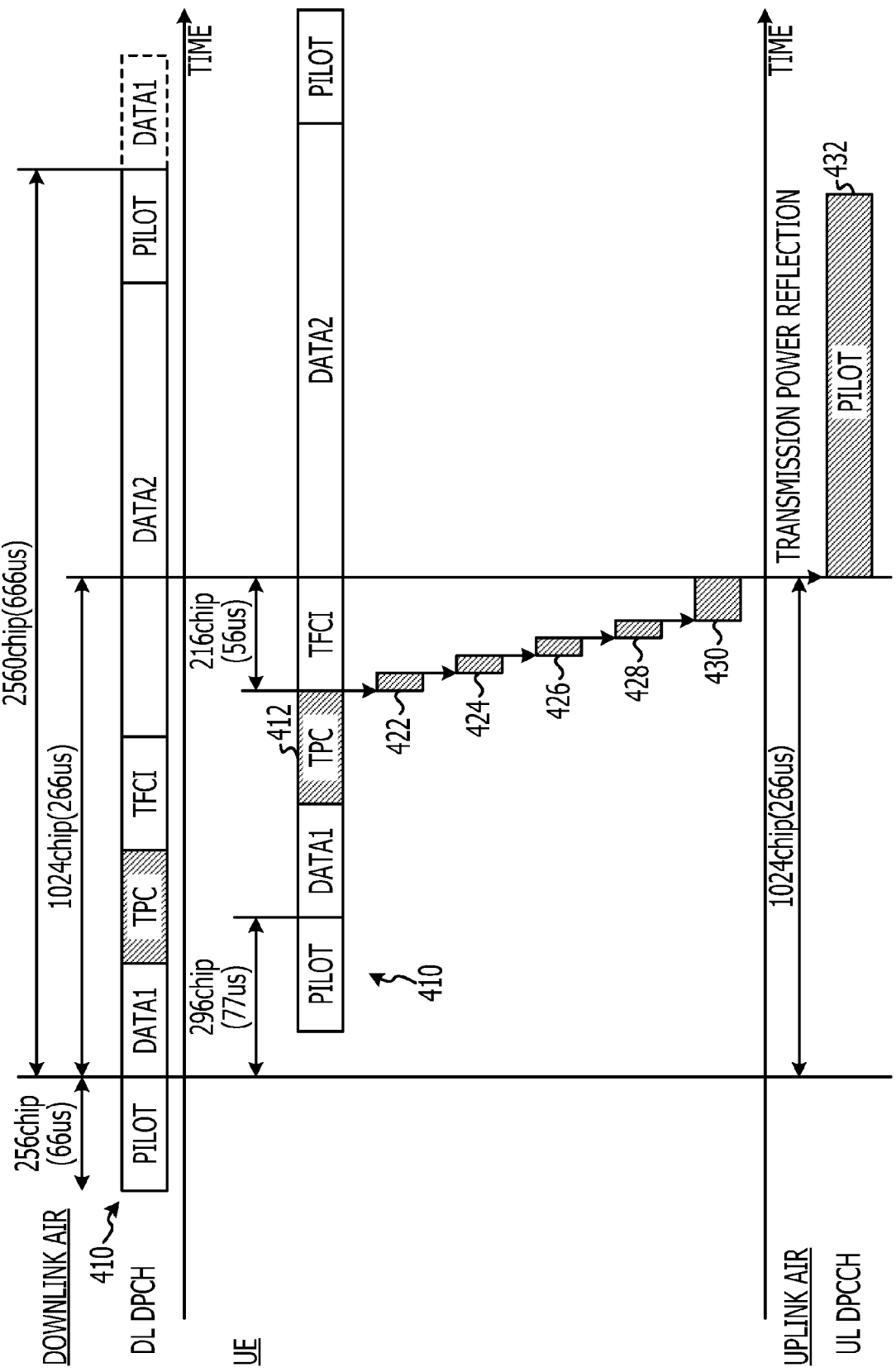
FIG. 2 is a diagram illustrating a time chart of transmission power control processing as specified in 3GPP.

FIG. 2 is a diagram illustrating a time chart of the transmission power control processing as specified in 3GPP. FIG. 2 illustrates a time chart of the transmission power control processing by the radio device 100 according to the present embodiment and illustrates occurrence of a delay offset of 296 chips by Soft Hand Over (SHO) as an example.

As illustrated in FIG. 2, according to 3GPP, a downlink DPCH 410 is received, and the Up/Down information of the transmission power of the TPC bit 412 included in the DPCH 410 is demodulated. According to 3GPP, the Up/Down information of the transmission power of the TPC bit is demodulated and is then reflected on the transmission power of the DPCCH of Up Link after 1024 chips. Regarding the downlink DPCH, the delay offset of the maximum 296 chips is generated when Soft Hand Over (SHO) is performed. Therefore, considering the maximum delay of the DPCH, after 216 chips after receiving the TPC symbol, the radio device has to perform the transmission power control by reflecting the Up/Down information of the TPC bit.

Here, according to the technique for performing the retransmission control of the data and performing the determining processing of the TPC bit after waiting for arrival of the retransmitted data if the error is detected in the reception data, the processing of the LVDS packet transferring processing takes longer than the process time of the LVDS packet transferring processing 422 illustrated in FIG. 2. Therefore, processing such as the TPV bit determining processing performed after the LVDS packet transferring processing and the transmission power calculating processing are delayed. As a result, the transmitting processing of the data may be performed by the transmission power that does not reflect the result obtained by demodulating the Up/Down information of the transmission power of the TPC bit 412.

On the contrary, the radio device 100 (UE: User Equipment) according to the present embodiment performs the LVDS packet transferring processing 422 after receiving the TPC bit 412. Here, if the error is detected in the reception data, the radio device 100 performs the retransmission control of the data and also performs the TPC bit determining processing 424 and the transmission power calculating processing 426 without waiting for the arrival of the retransmitted data by the retransmission control. The radio device 100 performs LVDS packet transferring processing 428 and transmission power control processing 430. The radio device 100 performs transmitting processing 432 of the data by the transmission power obtained by reflecting a demodulation result of the Up/Down information of the transmission power of the TPC bit 412. Therefore, regardless of the processing delay caused by the retransmission control, the radio device 100 may perform the transmission power control that reflects the Up/Down information of the TPC bit after 216 chips after receiving the TPC symbol.

Figure 3A:
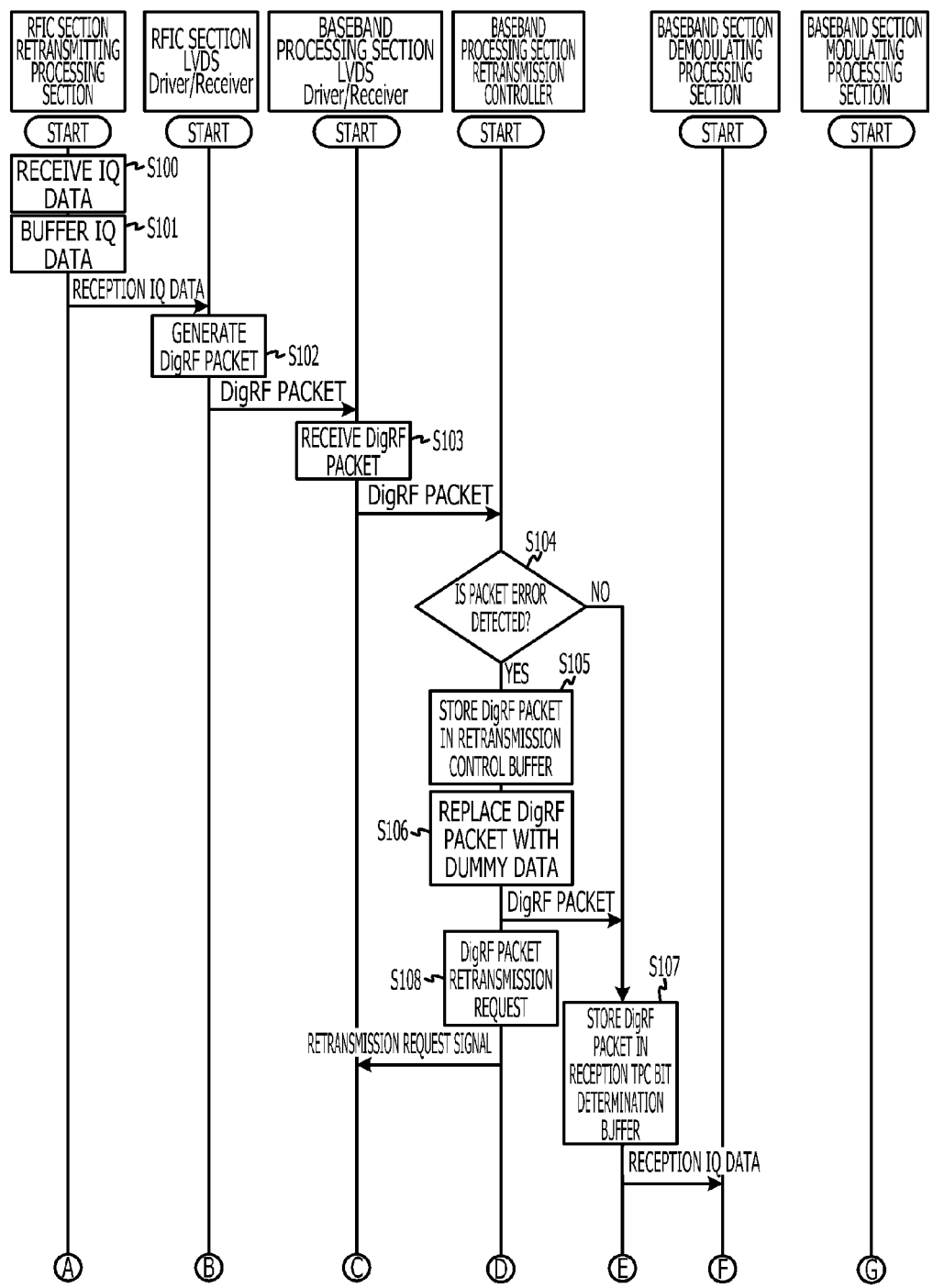
FIG. 3 including FIG. 3A
FIG. 3B is a flowchart of processing of the first embodiment of the radio device.
Figure 3B:
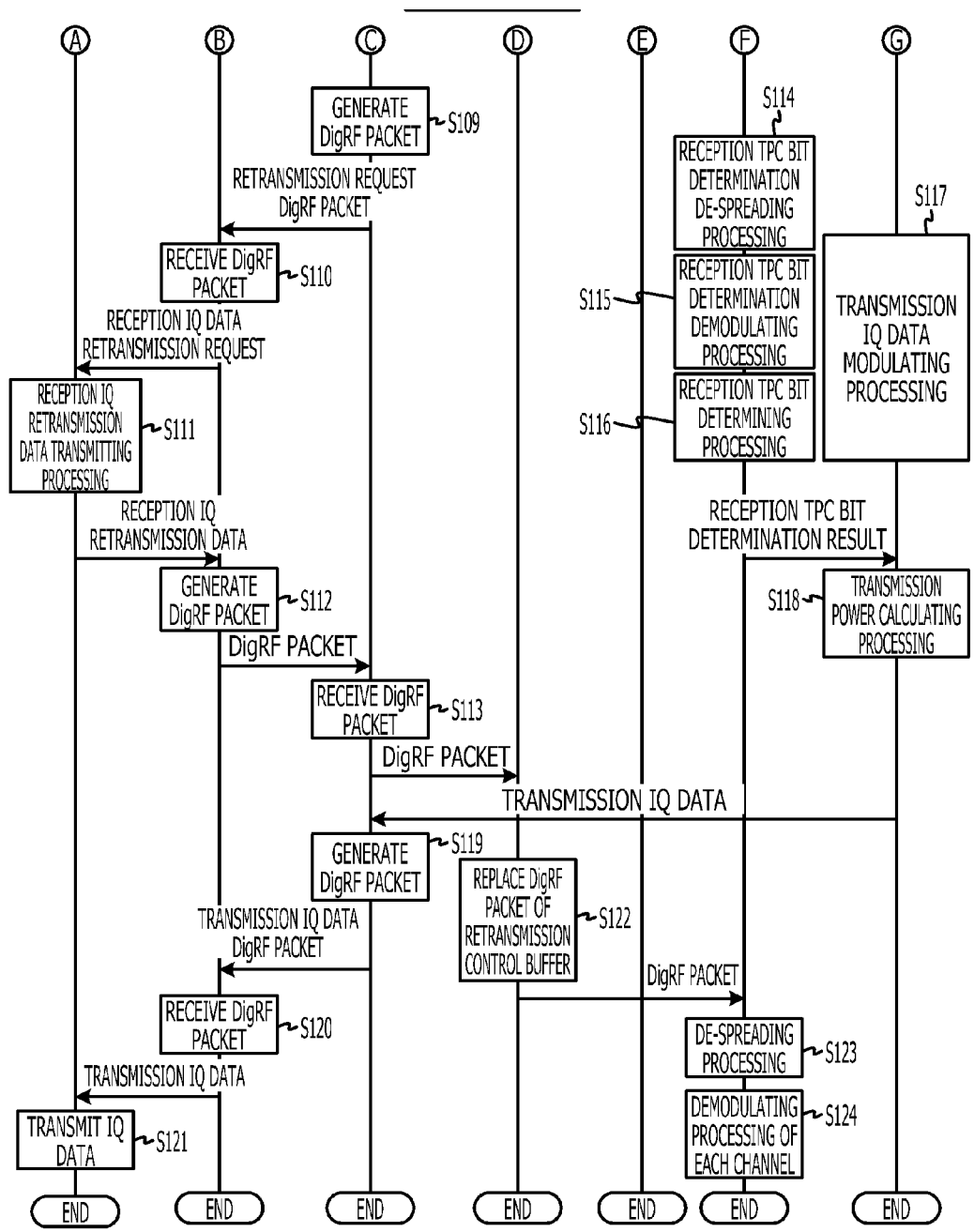

FIG. 3 is a flowchart of processing according to the first embodiment of the radio device. FIG. 3 illustrates a sequence of reception IQ data and the transmission power control in a case where communication is performed by the DigRFv4 standard.

The retransmission controller 208 receives the IQ data through the RxADC 202 (Operation S100). The retransmission controller 208 buffers the received IQ data in the memory and then outputs the IQ data to the LVDSDriver 210 (Operation S101). The LVDSDriver 210 generates a DigRF packet from the IQ data output from the retransmission controller 208 and then outputs the DigRF packet to the LVDSReceiver 311 (Operation S102).

The LVDSReceiver 311 receives the DigRF packet output from the LVDSDriver 210 and then outputs the DigRF packet to the retransmission controller 312 (Operation S103). The retransmission controller 312 determines whether the error is detected in the DigRF packet received by the LVDSReceiver 311 (Operation S104). If the error is detected in the DigRF packet (Yes in Operation S104), the retransmission controller 312 stores the DigRF packet in the retransmission control buffer 313 (Operation S105). The retransmission controller 312 replaces each of the 32 symbols of the DigRF packet with dummy data (for example, "0" for all of the data) and then stores the replaced DigRF packet in the TPC packet determination buffer 316 (Operation S107). On the other hand, if no error is detected in the DigRF packet (No in Operation S104), the retransmission controller 312 stores the DigRF packet in the TPC bit determination buffer 316 (Operation S107).

The retransmission controller 312 outputs a signal for requesting the retransmission control of the DigRF packet to the LVDSDriver 314 (Operation S108). The LVDSDriver 314 generates a retransmission request DigRF packet as the signal for requesting the retransmission control of the DigRF packet and then outputs the retransmission request DigRF packet to the LVDSReceiver 214 (Operation S109). The LVDSReceiver 214 receives and outputs the retransmission request DigRF packet to the retransmission controller 208 (Operation S110). The retransmission controller 208 receives the retransmission request of the reception IQ data from the LVDSReceiver 214 and then performs the transmitting processing of the reception IQ retransmission data (Operation S111).

The LVDSDriver 210 generates the DigRF packet from the retransmission IQ data output from the retransmission controller 208 and then outputs the DigRF packet to the LVDSReceiver 311 (Operation S112). The LVDSReceiver 311 receives the retransmitted DigRF packet output from the LVDSDriver 210 and then outputs the retransmitted DigRF packet to the retransmission controller 312 (Operation S113).

On the other hand, in parallel with the retransmitting processing in Operations S108 to S113, the reception TPC bit determination de-spreading processing section 340 performs the de-spreading processing of the TPC bit of the DigRF packet stored in the TPC bit determination buffer 316 (Operation S114). The reception TPC bit determination demodulating processing section 342 performs the demodulating processing of the TPC bit that is subjected to the de-spreading processing (Operation S115). Based on the TPC bit subjected to the demodulating processing, the reception TPC bit determining processing section 343 determines whether the TPC bit is Up or Down (Operation S116).

A modulating processing section of the baseband processing section 300 performs modulating processing on the transmission IQ data (Operation S117). Based on the determination result (Up or Down) of the reception TPC bit determined in Operation S116, the DPCCH/DPDCH transmission power calculating section 346 performs the calculating processing of the transmission power (Operation S118). The LVDSDriver 314 generates the DigRF packet from the transmission IQ data based on the transmission power that is calculated by the DPCCH/DPDCH transmission power calculating section 346 (Operation S119).

The LVDSReceiver 214 receives the DigRF packet output from the LVDSDriver 314 and then outputs the transmission IQ data to the retransmission controller 208 (Operation S120). The retransmission controller 208 transmits the transmission IQ data output from the LVDSReceiver 214 (Operation S121).

On the other hand, the retransmission controller 312 replaces the DigRF packet stored in the retransmission control buffer 313 with the retransmitted DigRF packet received in Operation S113 (Operation S122). The de-spreading processing section 320 performs the de-spreading processing on the retransmitted DigRF packet stored in the retransmission control buffer 313 (Operation S123). The CPICH demodulating processing section 322 and the DPCH demodulating processing section 326 perform the demodulating processing of the data output from the de-spreading processing section 320 (Operation S124).

The radio device 100 according to the first embodiment may suppress occurrence of a processing delay caused by the retransmission control of the data. That is, regarding the reception DPCH, in voice communication that desires real-time communication, a relatively high spreading factor (SF) (approximately 128) is used. One DigRF packet is transferred in 8 chips. Even if the error occurs to the 8 chips, the reception TPC bit desired in the calculating processing of the transmission power is able to be demodulated by the de-spreading processing if the packet is replaced with the dummy data. For example, the TPC bit diffuses the data for 1 bit to 256 chips. Even if the error occurs to the 8 chips out of 256 chips, the TPC bit determination is possible if there is rest information of 248 chips. If the error occurs to the DigRF packet with respect to modulation data used for the determining processing of the TPC bit, the radio device 100 may suppress the occurrence of the retransmission processing delay by replacing the packet with the dummy data without performing the retransmission control of DigRFv4. As a result, the radio device 100 may perform the transmission power processing as specified in 3GPP even if the error occurs to the DigRF packet.

The present embodiment has described an example of a case where the error occurs to the DigRF packet with respect to the demodulation data used for the determining processing of the TPC bit. However, the present invention is not limited to the present embodiment. For example, the baseband processing that is to be performed on a digital signal transmitted from the RFIC section 200 by the baseband processing section 300 is the demodulating processing that is to be performed on the data diffused by a spreading factor that is higher than a predetermined threshold value set in advance. In this case, similarly to the present first embodiment, the baseband processing may be performed without waiting for the reception of the retransmitted signal from the RFIC section 200.

Second Embodiment

Figure 4:
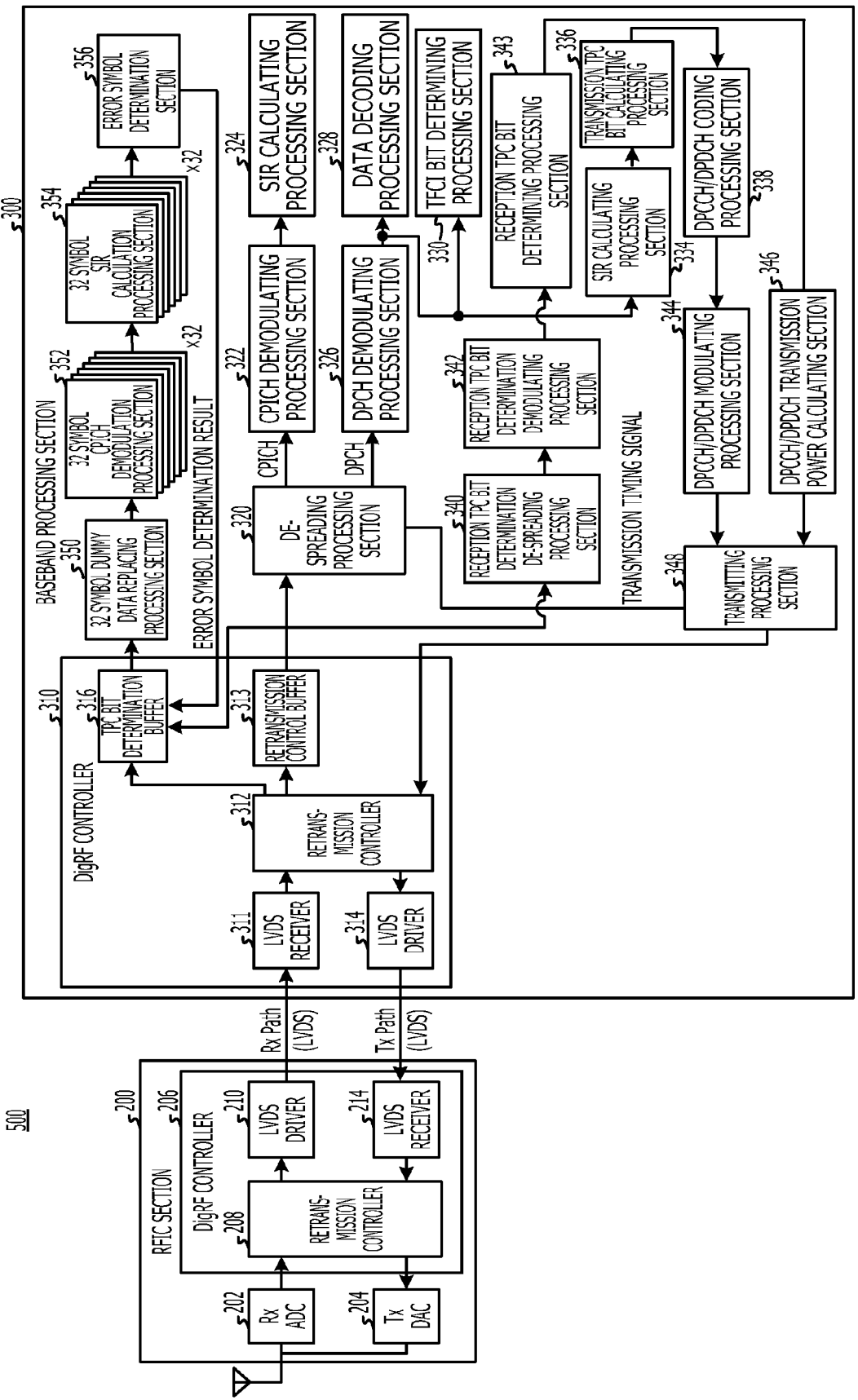
FIG. 4 is a diagram illustrating the entire configuration of a second embodiment of the radio device.

FIG. 4 is a diagram illustrating an entire configuration of a second embodiment of the radio device. A radio device 500 according to the second embodiment is formed by adding another processing block to the baseband processing section 300 of the radio device 100 according to the first embodiment. Except for the added processing block, the configuration is similar to the configuration according to the first embodiment, so that the overlapped description is omitted.

As illustrated in FIG. 4, the baseband processing section 300 of the radio device 500 includes a 32 symbol dummy data replacing processing section 350, a 32 symbol CPICH demodulating processing section 352, a 32 symbol SIR calculating processing section 354, and an error symbol determining section 356.

The 32 symbol dummy data replacing processing section 350 replaces 32 symbols for one packet of the DigRF packet stored in the TPC bit determination buffer 316 with dummy data. The 32 symbol CPICH demodulating processing section 352 performs the CPICH demodulating processing on the replaced reception IQ data (for 32 symbols).

The 32 symbol SIR calculating processing section 354 performs the SIR calculating on the replaced reception IQ data (for 32 symbols). The error symbol determining section 356 determines the symbol with the highest SIR value is an error symbol from among the reception IQ data (for 32 symbols). The error symbol determining section 356 reports the determination result of the error symbol to the TPC bit determination buffer 316 and then selects the packet in which the error symbol is replaced with a dummy symbol. The 32 symbol dummy data replacing processing section 350, the 32 symbol CPICH demodulating processing section 352, and the 32 symbol SIR calculating processing section 354 may perform performing processing in several cycles of a standard clock, respectively. Therefore, the performing processing may be performed at a relatively earlier process time than the process time of the retransmission processing of DigRF.

Figure 5:
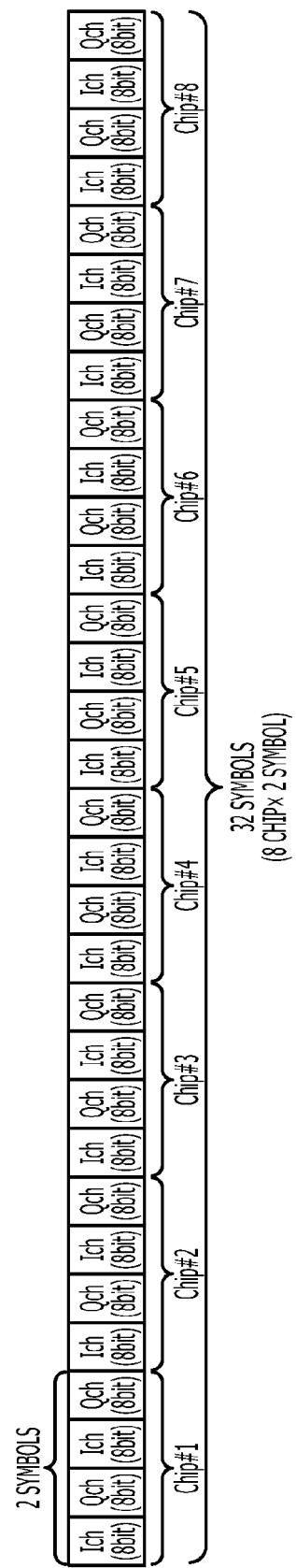
FIG. 5 is a diagram illustrating an example of a packet configuration of DigRF.

An example of a packet configuration of DigRF will be described. FIG. 5 is a diagram illustrating an example of the packet configuration of DigRF. As illustrated in FIG. 5, regarding one DigRF packet, information for 32 symbols in total in 8 chips*2 symbols with respect to the I channel and the Q channel. When the error occurs to the DigRF packet, the error occurs to simply one symbol from among the 32 symbols in most cases. The reception TPC bit desired for the calculating processing of the transmission power may be demodulated even if the error occurs to one symbol due to the de-spreading processing.

If the error occurs to the DigRF packet, by replacing each symbol with the dummy symbol, the CPICH demodulating processing to be performed on each symbol is performed on each symbol for one packet (32 symbols) of the DigRF packet with the error, so that an SIR value is calculated. By performing the demodulating processing on the symbol with the highest SIR value, the TPC bit determination may be performed with the DigRF packet with a high reliability excluding the symbol with the error. As a result, the retransmission processing delay of the DigRFv4 does not occur, so that the transmission power control is possible. The transmission power processing as specified in 3GPP may be performed.

Figure 6:
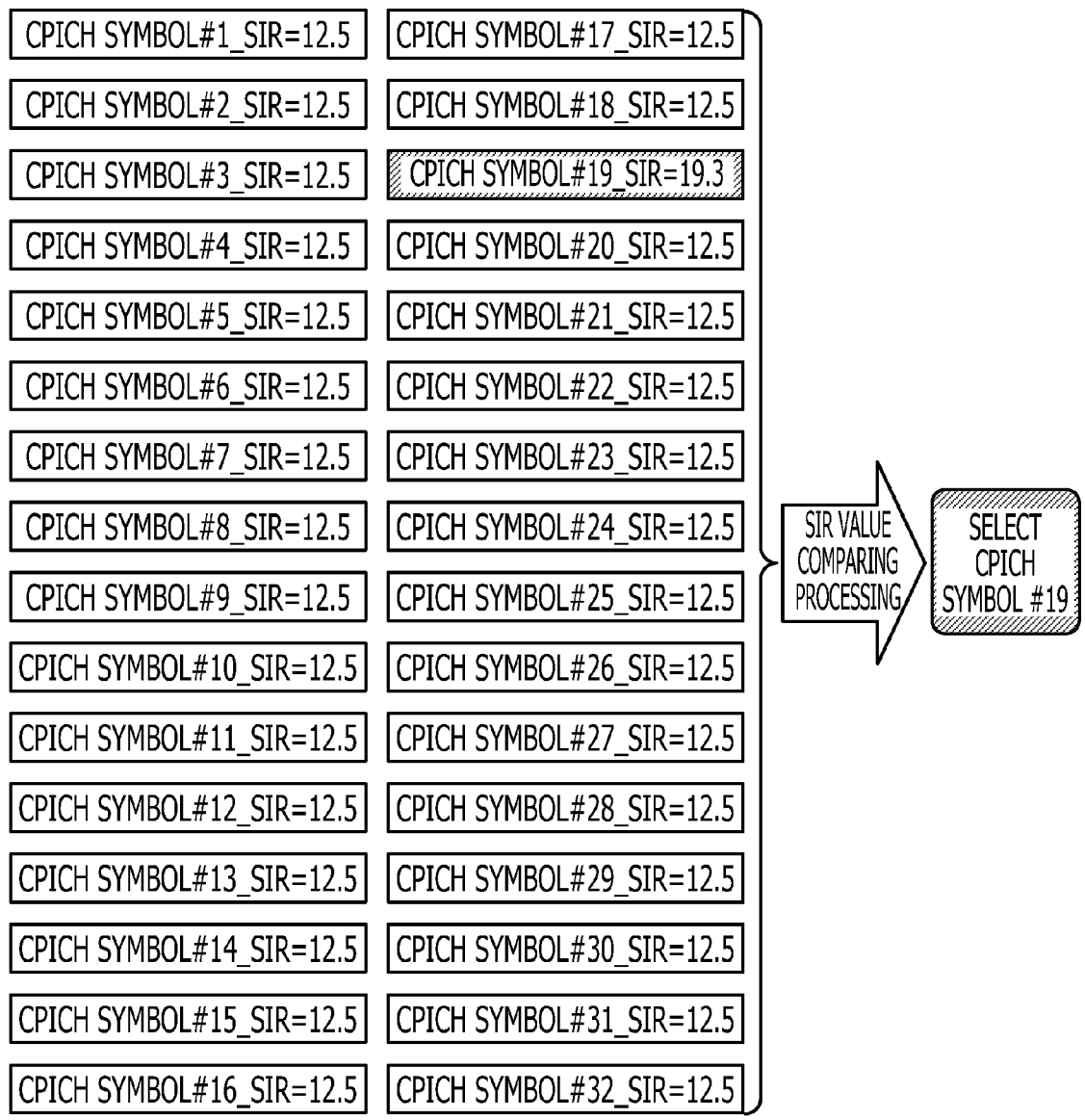
FIG. 6 is a diagram illustrating an example of comparing processing of an SIR value.

An example of the comparing processing of the SIR value by the radio device according to the second embodiment will be described. FIG. 6 is a diagram illustrating an example of the comparing processing of the SIR value. For example, the calculation result of the SIR value of each symbol of the DigRF packet obtained by the 32 symbol SIR calculating processing section 354 is illustrated in FIG. 6. For example, from among the 32 symbols of the DigRF packet, the SIR value of the $19^{th}$ symbol (CPICH symbol #19) is 19.3, and the SIR value of each of the other symbols is 12.5. In this case, the error symbol determining section 356 compares the SIR values of the symbols and then selects the $19^{th}$ symbol (CPICH symbol #19) with the highest SIR value as the error symbol.

Figure 7A:
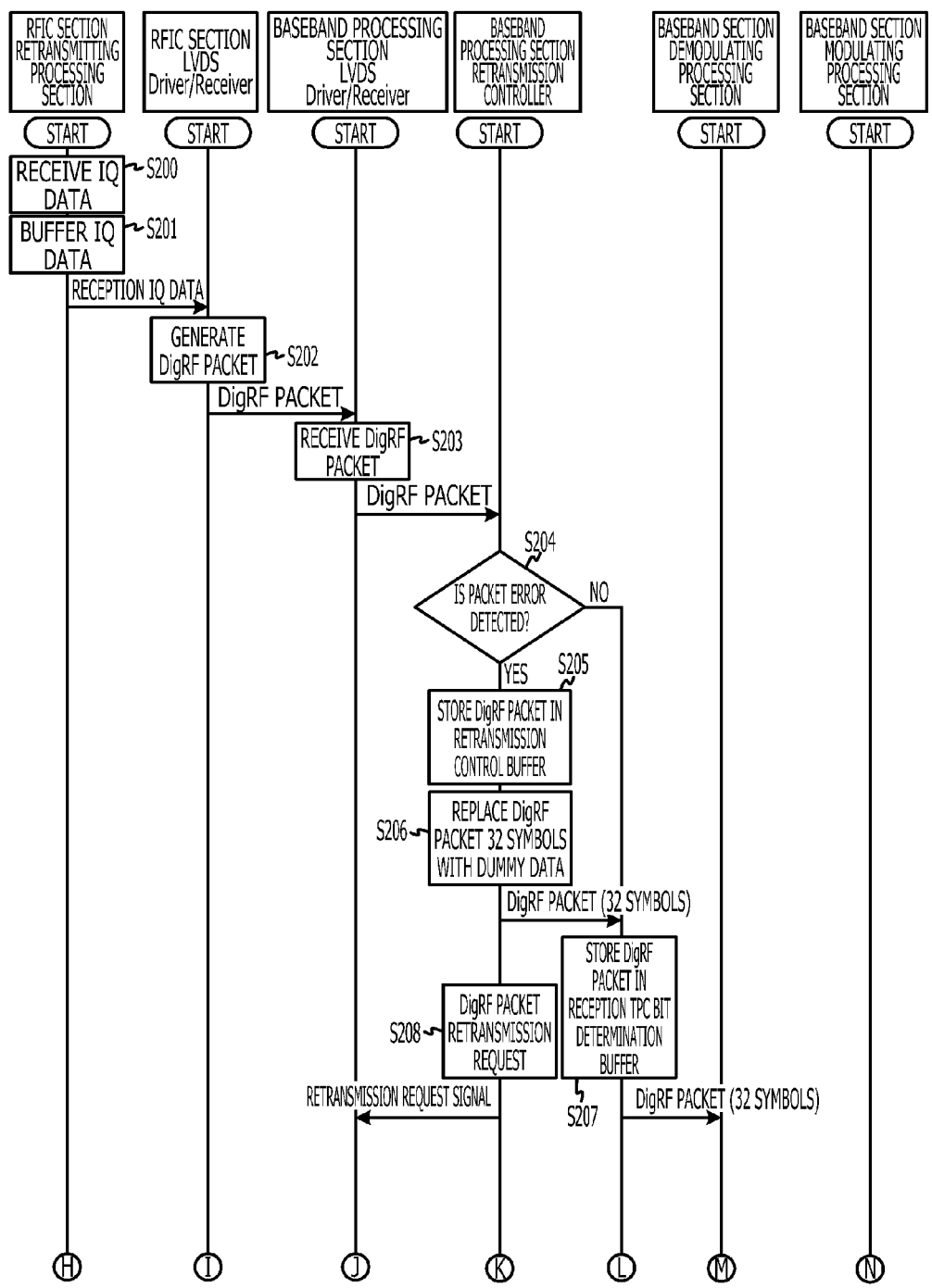
FIG. 7 including FIG. 7A
FIG. 7B is a flowchart of processing of the second embodiment of the radio device.
Figure 7B:
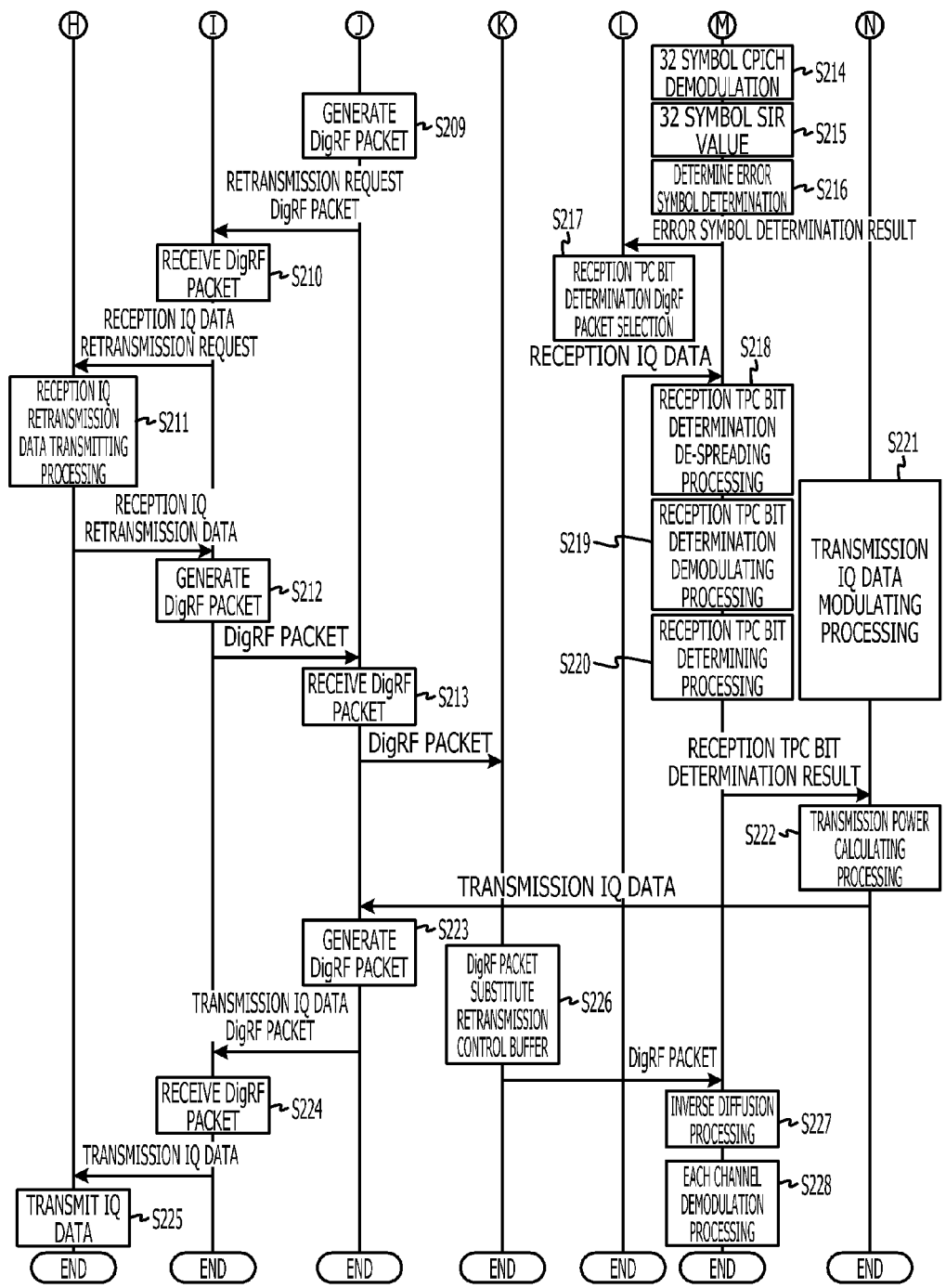

The processing of the radio device according to the second embodiment will be described. FIG. 7 is a flowchart of the processing of the second embodiment of the radio device. The retransmission controller 208 receives the IQ data through the RxADC 202 (Operation S200). The retransmission controller 208 buffers the received IQ data in the memory and then outputs the IQ data to the LVDSDriver 210 (Operation S201). The LVDSDriver 210 generates the DigRF packet from the IQ data output from the retransmission controller 208 and then outputs the DigRF packet to the LVDSReceiver 311 (Operation S202).

The LVDSReceiver 311 receives the DigRF packet output from the LVDSDriver 210 and then outputs the DigRF packet to the retransmission controller 312 (Operation S203). The retransmission controller 312 determines whether the error is detected in the DigRF packet received by the LVDSReceiver 311 (Operation S204). If the error is detected in the DigRF packet (Yes in Operation S204), the retransmission controller 312 stores the DigRF packet in the retransmission control buffer 313 (Operation S205). The retransmission controller 312 replaces each of the 32 symbols of the DigRF packet with the dummy data (for example, "0" for all data) (Operation S206) and then stores the replaced DigRF packet in the TPC bit determination buffer 316 (Operation S207). On the other hand, if no error is detected in the DigRF packet (No in Operation S204), the retransmission controller 312 stores the DigRF packet in the TPC bit determination buffer 316 (Operation S207).

The retransmission controller 312 outputs the signal for requesting the retransmission control of the DigRF packet to the LVDSDriver 314 (Operation S208). The LVDSDriver 314 generates the retransmission request DigRF packet as the signal for requesting the retransmission control of the DigRF packet and then outputs the retransmission request DigRF packet to the LVDSReceiver 214 (Operation S209). The LVDSReceiver 214 receives and outputs the retransmission request DigRF packet to the retransmission controller 208 (Operation S210). The retransmission controller 208 receives the retransmission request of the reception IQ data from the LVDSReceiver 214 and then performs the transmitting processing on the reception IQ retransmission data (Operation S211).

The LVDSDriver 210 generates the DigRF packet from the retransmission IQ data output from the retransmission controller 208 and then outputs the DigRF packet to the LVDSReceiver 311 (Operation S212). The LVDSReceiver 311 receives the retransmitted DigRF packet output from the LVDSDriver 210 and then outputs the retransmitted DigRF packet to the retransmission controller 312 (Operation S213).

On the other hand, the 32 symbol CPICH demodulating processing section 352 performs the CPICH demodulating processing on each packet (32 symbols) of the DigRF packet with the error (Operation S214). The 32 symbol SIR calculating processing section 354 calculates the SIR value for one packet (32 symbols) of the DigRF packet with the error (Operation S215). The error symbol determining section 356 determines that the symbol with the highest SIR value is the error symbol in the one packet (32 symbols) of the DigRF packet with the error (Operation S216).

Based on the determination result of the error symbol, the retransmission controller 312 selects the DigRF packet of the reception TPC bit (Operation S217). The reception TPC bit determination de-spreading processing section 340 performs the de-spreading processing of the selected DigRF packet (Operation S218). The reception TPC bit determination demodulating processing section 342 performs the demodulating processing of the DigRF packet that is subjected to the de-spreading processing (Operation S219). Based on the DigRF packet that is subjected to the demodulating processing, the reception TPC bit determining processing section 343 determines whether the TPC bit is Up or Down (Operation S220).

The modulating processing section of the baseband processing section 300 performs the modulating processing of the transmission IQ data (Operation S221). Based on the determination result (Up or Down) of the reception TPC bit determined in Operation S220, the DPCCH/DPDCH transmission power calculating section 346 performs the calculating processing of the transmission power (Operation S222). The LVDSDriver 314 generates the DigRF packet from the transmission IQ data based on the transmission power calculated by the DPCCH/DPDCH transmission power calculating section 346 (Operation S223).

The LVDSReceiver 214 receives the DigRF packet output from the LVDSDriver 314 and then outputs the transmission IQ data to the retransmission controller 208 (Operation S224). The retransmission controller 208 transmits the transmission IQ data output from the LVDSReceiver 214 (Operation S225).

On the other hand, the retransmission controller 312 replaces the DigRF packet stored in the retransmission control buffer 313 with the retransmitted DigRF packet received in Operation S213 (Operation S226). The de-spreading processing section 320 performs the de-spreading processing on the retransmitted DigRF packet stored in the retransmission control buffer 313 (Operation S227). The CPICH demodulating processing section 322 and the DPCH demodulating processing section 326 perform the demodulating processing on the data output from the de-spreading processing section 320 (Operation S228).

Like the radio device 100 according to the first embodiment, the radio device 500 according to the second embodiment may suppress the occurrence of the processing delay caused by the retransmission control of the data. That is, regarding the reception DPCH, a relatively high spreading factor (SF) (approximately 128) is used in voice communication that desires real-time communication. One DigRF packet is transferred in 8 chips. Even if the error occurs to the 8 chips, the reception TPC bit desired in the calculating processing of the transmission power is able to be demodulated by the de-spreading processing if the packet is replaced with the dummy data. If the error occurs to the DigRF packet with respect to the demodulation data used for the determining processing of the TPC bit, the radio device 100 may suppress the occurrence of the retransmission processing delay without performing the retransmission control of DigRFv4 by replacing the packet with the dummy data. As a result, even if the error occurs to the DigRF packet, the radio device 100 may perform the transmission power processing as specified in 3GPP while performing the retransmission control.

In addition, if the error occurs to the DigRF packet, with respect to the demodulation data of the reception IQ data used for the determining processing of the TPC bit, the radio device 500 determines which symbol has the error in the one packet (32 symbols) of the DigRF packet with the error. The radio device 500 may perform the transmission power control without generating the retransmission processing delay of DigRFv4 by replacing the symbol with the error with the dummy data. As a result, the radio device 500 may perform the transmission power processing as specified in 3GPP.

The first and second embodiments have described mainly the radio device 100 and the radio device 500. However, the present invention is not limited to the first and second embodiments. By executing a radio communication control program that is provided in advance, the functions that are similar to the above-described embodiments may be achieved. That is, the radio communication control program makes the radio device, which is coupled to a radio section through a digital communication path and which includes the baseband processing section performing the baseband processing on the digital signal received from the radio section through the digital communication path, perform the following processing. That is, the radio communication control program makes the radio device perform error detection of a digital signal before the baseband processing on the digital signal received from the radio section through the digital communication path. Furthermore, the radio communication control program makes the radio device perform the baseband processing without waiting for reception of a retransmitted signal from the radio section if the error is detected in the digital signal. The radio communication control program may be distributed to computers through a communication network such as the Internet. The radio communication control program is stored in a computer-readable storage medium such as a memory, a hard disk, or another computer, so that the radio communication control program may be executed by being read out from the storage medium by a computer.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A radio device, comprising:
    a radio section configured to transmit a digital signal through a digital communication path; and
    a baseband processing section configured to:
    perform a baseband processing on the digital signal received from the radio section,
        perform error detection of the digital signal before performing the baseband processing, and
        when an error is detected in the digital signal, perform the baseband processing before reception of a retransmitted signal from the radio section.

2. The radio device according to claim 1, wherein the baseband processing section is configured to perform the baseband processing before the reception of the retransmitted signal when the error is detected in the digital signal and when the baseband processing to be performed on the digital signal is a demodulating processing of a Dedicated Physical Channel (DPCH).

3. The radio device according to claim 1, when the baseband processing section is configured to perform the baseband processing before the reception of the retransmitted signal, the baseband processing section is configured to perform the baseband processing by replacing the digital signal in which the error is detected with dummy data.

4. The radio device according to claim 1, wherein the digital signal is packet data which includes a plurality of data symbols and the baseband processing section is configured to perform the baseband processing by replacing some of the plurality of data symbols included in the digital signal with a predetermined dummy symbol.

5. The radio device according to claim 4, wherein, when the error is detected in the digital signal, the baseband processing section is configured to:
    generate a plurality of dummy data obtained by replacing some parts, which are different from each other from among a plurality of data symbols included in the digital signal, with the dummy symbol;
    calculate a reception signal strength based on each of the generated dummy data; and
    replace the digital signal in the error detection position by using the dummy data selected based on the reception signal strength.

6. The radio device according to claim 1, wherein the baseband processing section is configured to perform the baseband processing before the reception of the retransmitted signal from the radio section when the error is detected in the digital signal and when the baseband processing to be performed on the digital signal is demodulating processing to be performed on the data which is diffused with a spreading factor that is higher than a threshold value set in advance.

7. The radio device according to claim 1, wherein the baseband processing section is configured to perform the baseband processing before the reception of the retransmitted signal when the error is detected in the digital signal and when the baseband processing to be performed on the digital signal is demodulating processing of a TPC bit of a Dedicated Physical Channel (DPCH).

8. The radio device according to claim 1, the baseband processing section comprising:
    a retransmission controller configured to perform the error detection of the digital signal and transmit a signal for requesting retransmission of the digital signal to the radio section when the error is detected; and
    a processing performing section configured to perform the baseband processing before the reception of the retransmitted signal when the error is detected in the digital signal.

9. The radio device according to claim 1, the baseband processing section comprising:

a transmission controller configured to perform the error detection of the digital signal and then transmit a signal for requesting retransmission of the digital signal when the error is detected;

a first processing performing section configured to wait for reception of a retransmitted signal from the radio section when the error is detected in the digital signal; and a second processing performing section configured to does perform the baseband processing before reception of the retransmitted signal from the radio section when the error is detected in the digital signal based on the digital signal in which the error is detected.

10. A radio communication control method, comprising;

performing error detection of a digital signal before performing a baseband processing on the digital signal received from a radio section through a digital communication path; and performing, with a processor, the baseband processing before reception of a retransmitted signal from the radio section when an error is detected in the digital signal.

11. The radio communication control method according to claim 10, comprising performing the baseband processing before the reception of the retransmitted signal from the radio section when the error is detected in the digital signal and when the baseband processing to be performed on the digital signal is demodulating processing of a Dedicated Physical Channel (DPCH).

12. The radio communication control method according to claim 10, wherein the baseband processing is performed by replacing the digital signal in which the error is detected with the dummy data when the baseband processing is performed before the reception of the retransmitted signal.

13. The radio communication control method according to claim 10, wherein the digital signal received from the radio section through the digital communication path is packet data which includes a plurality of data symbols, and wherein, when the error is detected in the digital signal, the baseband processing is performed by replacing some of the plurality of data symbols included in the digital signal with a prescribed dummy symbol.

14. The radio communication control method according to claim 13, wherein when the error is detected in the digital signal, the radio communication method performs the baseband processing, and wherein the baseband processing comprises:

generating a plurality of dummy data in which some different parts of the plurality of data symbols included in the digital signal are replaced with a predetermined dummy symbol;

calculating a reception signal strength based on each of the generated dummy data; and replacing the digital signal in an error detection part by using the dummy data selected based on the reception signal strength.

15. The radio communication control method according to claim 10, wherein the radio communication control method performs the baseband processing before the reception of the retransmitted signal when the error is detected in the digital signal and when the baseband processing to be performed on the digital signal is demodulating processing to be performed on data diffused with a spreading factor which is higher than a threshold value set in advance.

16. The radio communication control method according to claim 10, wherein the radio communication control method performs the baseband processing before the reception of the retransmitted signal when the error is detected in the digital signal and when the baseband processing to be performed on the digital signal is demodulating processing of a TPC bit of a Dedicated Physical Channel (DPCH).

17. The radio communication control method according to claim 10, wherein the baseband processing comprises:

performing the error detection of the digital signal and transmitting a signal for requesting the retransmission of the digital signal to the radio section when the error is detected; and performing the baseband processing before the reception of the retransmitted signal from the radio section when the error is detected in the digital signal.

18. The radio communication control method according to claim 10, wherein the baseband processing comprises:

performing the error detection of the digital signal and transmitting a signal for requesting the retransmission of the digital signal to the radio section when the error is detected;

waiting for the reception of the retransmitted signal when the error is detected in the digital signal and performing a first processing for performing the baseband processing based on the received retransmitted signal; and performing a second processing for performing the baseband processing based on the digital signal in which the error is detected before the reception of the retransmitted signal from the radio section when the error is detected in the digital signal.

19. A computer-readable recording medium having stored therein a program for causing a computer to execute a radio communication control process comprising:

performing error detection of a digital signal before performing a baseband processing on the digital signal received from a radio section through a digital communication path; and performing the baseband processing before reception of a retransmitted signal from the radio section when an error is detected in the digital signal.

* * * * *